United States Patent
Kamada et al.

(10) Patent No.: US 11,816,569 B2
(45) Date of Patent: Nov. 14, 2023

(54) PROCESSING METHOD AND PROCESSING DEVICE USING SAME

(71) Applicant: Panasonic Intellectual Property Management Co., Ltd., Osaka (JP)

(72) Inventors: Shohei Kamada, Osaka (JP); Toshihide Horii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 511 days.

(21) Appl. No.: 17/040,478

(22) PCT Filed: Mar. 25, 2019

(86) PCT No.: PCT/JP2019/012593
§ 371 (c)(1),
(2) Date: Sep. 22, 2020

(87) PCT Pub. No.: WO2019/189026
PCT Pub. Date: Oct. 3, 2019

(65) Prior Publication Data
US 2021/0027095 A1 Jan. 28, 2021

(30) Foreign Application Priority Data
Mar. 26, 2018 (JP) .................. 2018-058736

(51) Int. Cl.
*G06N 3/08* (2023.01)
*G06F 18/213* (2023.01)
(Continued)

(52) U.S. Cl.
CPC ............. *G06N 3/08* (2013.01); *G06F 18/213* (2023.01); *G06F 18/232* (2023.01); *G06V 10/82* (2022.01); *G06V 30/422* (2022.01)

(58) Field of Classification Search
None
See application file for complete search history.

(56) References Cited

U.S. PATENT DOCUMENTS

2019/0080164 A1* 3/2019 Duke .................. G06N 3/08

FOREIGN PATENT DOCUMENTS

| JP | H04-098378 A | 3/1992 |
| JP | H09-322354 A | 12/1997 |
| JP | H10-111937 A | 4/1998 |

OTHER PUBLICATIONS

Extended European Search Report issued in corresponding European Patent Application No. 19776893.0, dated Apr. 1, 2021.
(Continued)

*Primary Examiner* — Leon Flores
(74) *Attorney, Agent, or Firm* — McDermott Will & Emery LLP

(57) ABSTRACT

A first processing unit detects each of a plurality of patterns included in the image as one of families by subjecting the image to a neural network process. An extraction unit extracts a plurality of parts that include families from the image, based on a position of the families detected. A second processing unit acquires intermediate data for an intermediate layer unique to each family, by subjecting the plurality of parts extracted to a neural network process. A clustering unit subjects the intermediate data acquired to clustering in accordance with the number of types of pattern. A calculation unit calculates a number of patterns included in each cluster that results from clustering.

7 Claims, 8 Drawing Sheets

(51) Int. Cl.
*G06F 18/232* (2023.01)
*G06V 10/82* (2022.01)
*G06V 30/422* (2022.01)

(56) References Cited

OTHER PUBLICATIONS

Bolei Zhou et al., "Object Detectors Emerge in Deep Scene CNNs," Apr. 15, 2015, pp. 1-12, XP055528912.
Shaoqing Ren et al., "Faster R-CNN: Towards Real-Time Object Detection with Region Proposal Networks," IEEE Transactions on Pattern Analysis and Machine Intelligence, vol. 39, No. 6, Jun. 5, 2016, pp. 1137-1149, XP055705510.
Luoting Fu et al., "From engineering diagrams to engineering models: Visual recognition and applications," Computer-Aided Design, Elsevier Publishers BV., Barking, GB, vol. 43, No. 3, Dec. 25, 2010, pp. 278-291, XP028144142.
International Search Report issued in corresponding international Patent Application No. PCT/JP2019/012593, dated May 21, 2019, with English translation.

* cited by examiner

FIG.2

| FAMILY | PATTERN | | | | | |
|---|---|---|---|---|---|---|
| INTERCOM FAMILY | 30a | | 30b | 30c | 30d | |
| DIFFERENTIAL SMOKE DETECTOR FAMILY | 32a | 32b | 32c | 32d | 32e | 32f |
| PHOTOELECTRIC SMOKE DETECTOR FAMILY | 34a | 34b | 34c | 34d | 34e | 34f |

FIG.6A

| FAMILY | COUNT |
|---|---|
| INTERCOM FAMILY | 1 |
| DIFFERENTIAL SMOKE DETECTOR FAMILY | 15 |
| PHOTOELECTRIC SMOKE DETECTOR FAMILY | 14 |

FIG.6B

| PATTERN | COUNT |
|---|---|
| 30b (IP) | 1 |
| 32b | 8 |
| 32d (150) | 2 |
| 32e | 4 |
| 32f | 1 |
| 34a | 2 |
| 34b | 2 |
| 34c | 1 |
| 34d | 3 |
| 34e | 3 |
| 34f | 3 |

//  # PROCESSING METHOD AND PROCESSING DEVICE USING SAME

CROSS-REFERENCE OF RELATED APPLICATIONS

This application is the U.S. National Phase under 35 U.S.C. § 371 of International Patent Application No. PCT/JP2019/012593, filed on Mar. 25, 2019, which in turn claims the benefit of Japanese Application No. 2018-058736, filed Mar. 26, 2018, the entire disclosures of which Applications are incorporated by reference herein.

TECHNICAL FIELD

The present disclosure relates to a processing technology and, more particularly, to a processing method for processing an image and a processing device that uses the processing method.

BACKGROUND ART

In recent years, construction drawings are easily created by using a computer-aided design (CAD) system. However, data for construction drawings created in different systems are not compatible with each other, and it may not be possible to use the data when a period elapses or the contractor is changed. This will require quite a lot of effort to extract electric symbols from construction drawings already created. To extract electric symbols drawn on a construction drawing, a process is performed to create outline data for an image based on run data of image data produced by reading an image of the construction drawing and to define outline data, for which the degree of circularity of the outline loop for the outline data is equal to or greater than a threshold value, as an electric symbol (see, for example, patent literature 1).
[Patent Literature 1] JP10-111937

SUMMARY OF INVENTION

Technical Problem

A neural network can be used to extract a pattern such as that of electric symbols from an image such as a construction drawing. Extraction of patterns makes it possible to integrate a plurality of patterns included in the image for each type of pattern. Because there are a large number of types of pattern, however, it is difficult to cause a neural network to learn all patterns. Meanwhile, insufficient learning reduces the accuracy of the process.

The present disclosure addresses the above-described issue, and an illustrative purpose thereof is to provide a technology for inhibiting reduction in the accuracy of the process, while inhibiting an increase in the volume of work required for learning at the same time.

Solution to Problem

A processing device according to an embodiment of the present disclosure is a processing device for integrating a plurality of patterns included in an image for each type of pattern, including: an input unit that receives an input of an image; a first processing unit that detects each of a plurality of patterns included in the image as one of families that organize types of pattern, by subjecting the image input to the input unit to a process in a neural network trained to learn the families as training data, a number of families being smaller than a number of types of pattern; an extraction unit that extracts a plurality of parts that include families from the image, based on a position of the families detected by the first processing unit; a second processing unit that acquires intermediate data for an intermediate layer unique to each family, by subjecting the plurality of parts extracted by the extraction unit to a process in a neural network trained to learn the families as training data, the families organizing types of pattern, and the number of families being smaller than the number of types of pattern; a clustering unit that subjects the intermediate data acquired by the second processing unit to clustering in accordance with the number of types of pattern; and a calculation unit that calculates a number of patterns included in each cluster that results from clustering in the clustering unit.

Another embodiment of the present disclosure relates to a processing method. The method is a processing method for integrating a plurality of patterns included in an image for each type of pattern, including: receiving an input of an image; detecting each of a plurality of patterns included in the image as one of families that organize types of pattern, by subjecting the image input to a process in a neural network trained to learn the families as training data, a number of families being smaller than a number of types of pattern; extracting a plurality of parts that include families from the image, based on a position of the families detected; acquiring intermediate data for an intermediate layer unique to each family, by subjecting the plurality of parts extracted to a process in a neural network trained to learn the families as training data, the families organizing types of pattern, and the number of families being smaller than the number of types of pattern; subjecting the intermediate data acquired to clustering in accordance with the number of types of pattern; and calculating a number of patterns included in each cluster that results from clustering.

Optional combinations of the aforementioned constituting elements, and implementations of the present disclosure in the form of devices, systems, computer programs, recording mediums recording computer programs, etc. may also be practiced as additional modes of the present invention.

Advantageous Effects of Invention

According to the present disclosure, it is possible to inhibit reduction in the accuracy of the process, while inhibiting an increase in the volume of work required for learning at the same time.

BRIEF DESCRIPTION OF DRAWINGS

FIG. 2 shows patterns and families that could be included in the image of FIG. 1;
FIGS. 6A-6B show results of the process in the processing device of FIG. 3B.

DESCRIPTION OF EMBODIMENTS

A summary will be given before describing the embodiment of the present disclosure in specific details. The embodiment relates to a processing device that refers to a construction drawing showing a plurality of electric symbols and integrates the count for each type of electric symbol. It is possible to use a neural network to improve the precision of extraction of electric symbols from a construction drawing. However, there are as many as several tens of types of electric symbol, and there are also electric symbols having similar shapes. For this reason, it is difficult to cause a neural network to learn all electric symbols, and a false determination may be yielded when a new electric symbol occurs. A false determination may be yielded due also to insufficient learning.

To address this, this embodiment takes advantage of the fact that a plurality of patterns are organized into groups fewer than the number of types of electric symbol, by aggregating electric symbols having similar shapes into a group. Hereinafter, electric symbols are referred to as "patterns", a group is referred to as a "family", and a construction drawing is referred to as an "image". For example, patterns are organized into three families including intercom family, differential smoke detector family, and photoelectric smoke detector family. In this condition, the neural network in the processing device is configured to learn these families. When an image is input to the processing device, families shown in the image are detected by the process in the neural network, and the positions of the families are identified. The processing device extracts those parts that include families from the image, based on the positions of the families. Further, the processing device outputs intermediate data for a particular intermediate layer by performing a neural network process in each extracted part. Further, the processing device clusters the intermediate data and then calculates the number of patterns included in each cluster.

Figure 1:
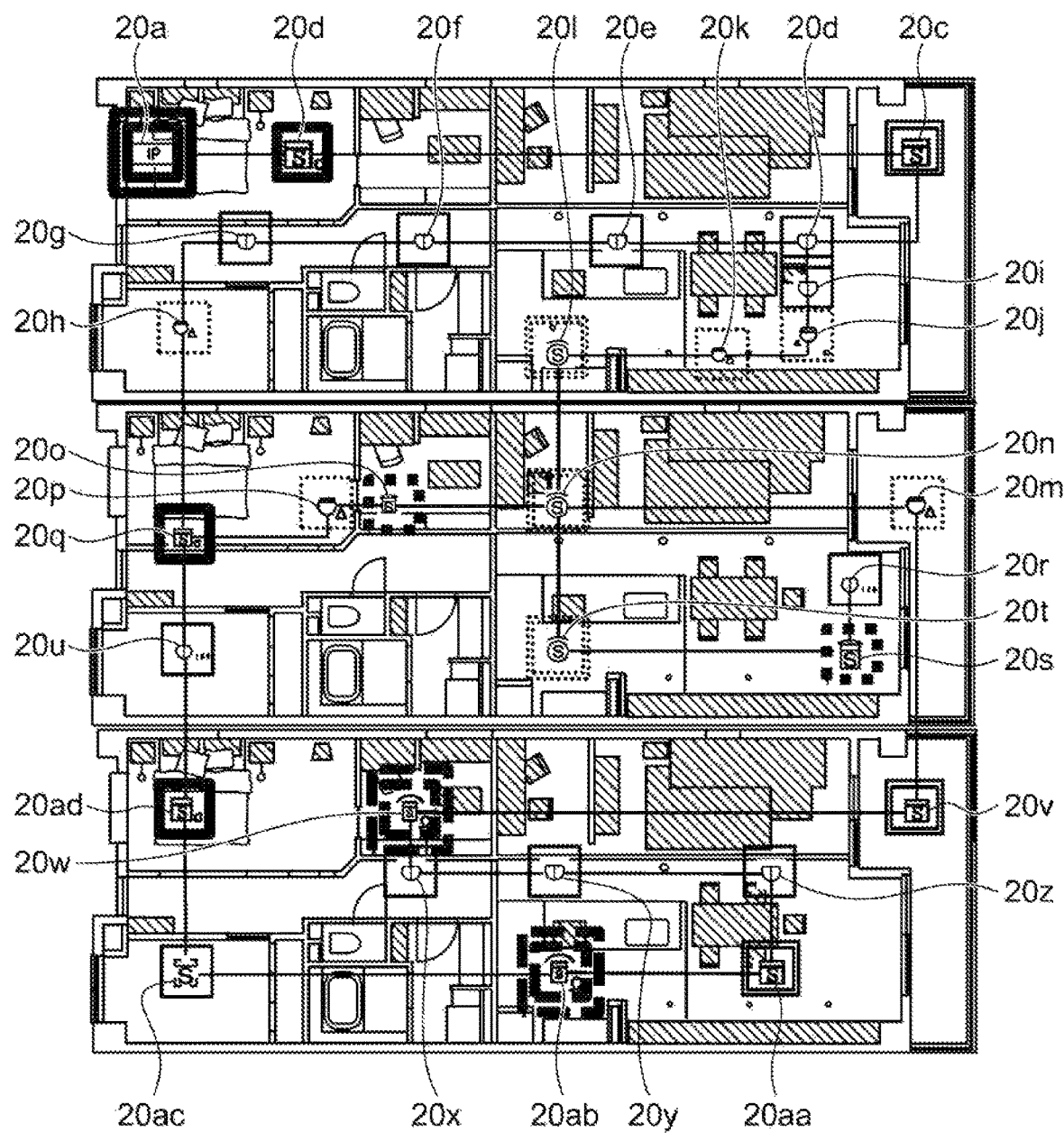
FIG. 1 shows an image subject to the process of the embodiment.

FIG. 1 shows an image 10 subject to the process. An example of the image 10 is a construction drawing, as mentioned above. The image 10 include a first pattern 20a through a 26th pattern 20z, which are generically referred to as patterns 20, a 27th pattern 20aa, a 28th pattern 20ab, a 29th pattern 20ac, and a 30th pattern 20ad. Each pattern 20 is an electric symbol. It is assumed that a total of "30" patterns 20 are included in the image 10, but the number of patterns is not limited to this. A different shape of the pattern 20 signifies a different electric symbol and so corresponds to a different device. For example, the fifth pattern 20e and the sixth pattern 20f have the same shape, and the fifth pattern 20e and the first pattern 20a have different shapes. To draft a quotation based on the image 10 like this, it is necessary to count the number of patterns 20 for each type of the pattern 20. The larger the size of the image 10 and the larger the number of patterns 20 included in the image 10, the greater the effort required for the work.

FIG. 2 shows patterns 20 and families that could be included in the image 10. Patterns 20 having similar shapes are defined for similar devices. In this case, patterns 20 having similar shapes are aggregated in a family. As illustrated, three families including intercom family, differential smoke detector family, and photoelectric smoke detector family are defined. Further, the intercom family includes a first intercom 30a through a fourth intercom 30d, which are generically referred to as intercoms 30. The differential smoke detector family includes a first differential smoke detector 32a through a sixth differential smoke detector 32f, which are generically referred to as differential smoke detectors 32. The photoelectric smoke detector family includes a first photoelectric smoke detector 34a through a sixth photoelectric smoke detector 34f, which are generically referred to as photoelectric smoke detectors 34. Each of the intercom 30, the differential smoke detector 32, and the photoelectric smoke detector 34 is one of the patterns 20. For example, the first pattern 20a of FIG. 1 is the second intercom 30b, and second pattern 20b is the sixth photoelectric smoke detector 34f. It can thus be said that the family organizes the types of pattern 20. Further, the number of types of family is smaller than the number of types of pattern 20.

Figure 3A:
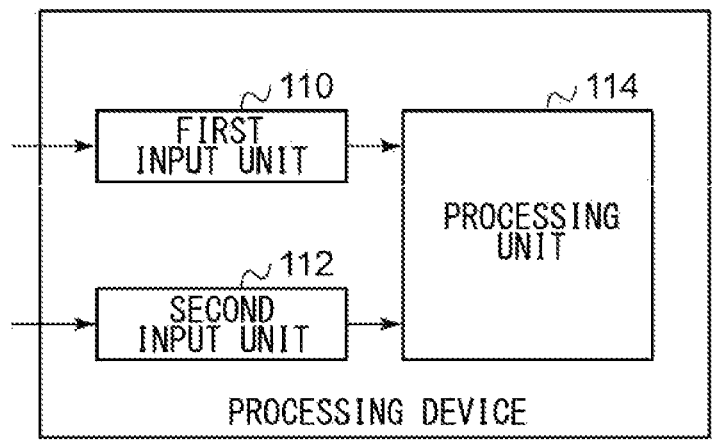
FIGS. 3A-3B shows a configuration of the processing device according to the embodiment.
Figure 3B:
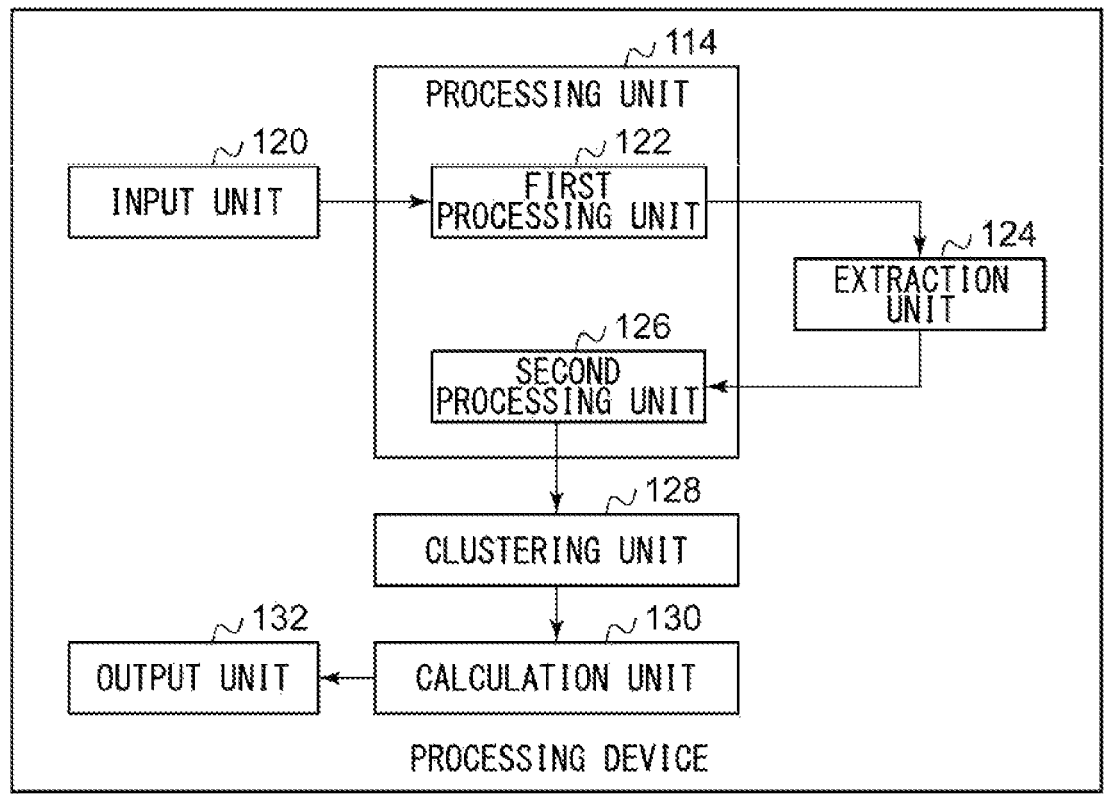

FIGS. 3A-3B shows a configuration of the processing device 100. In particular, FIG. 3A shows a configuration for a learning process, and FIG. 3B shows a configuration for an integration process. An integration process is a process of integrating the plurality of patterns 20 included in the image 10 for each type of pattern 20, while organizing the patterns 20 into families, by using a neural network in the image 10. The processing device 100 in FIG. 3A may be identical to or different from the processing device 100 in FIG. 3B.

The processing device 100 includes, as features for a learning process, a first input unit 110, a second input unit 112, and a processing unit 114, and includes, as features for an integration process, an input unit 120, a processing unit 114, an extraction unit 124, a clustering unit 128, a calculation unit 130, and an output unit 132. Further, the processing unit 114 includes a first processing unit 122 and a second processing unit 126. The processing unit 114 is used in a learning process, and the processing unit 114 is used in an integration process. The configuration of the processing unit 114 will be described before describing the configuration of the processing device 100.

Figure 4:
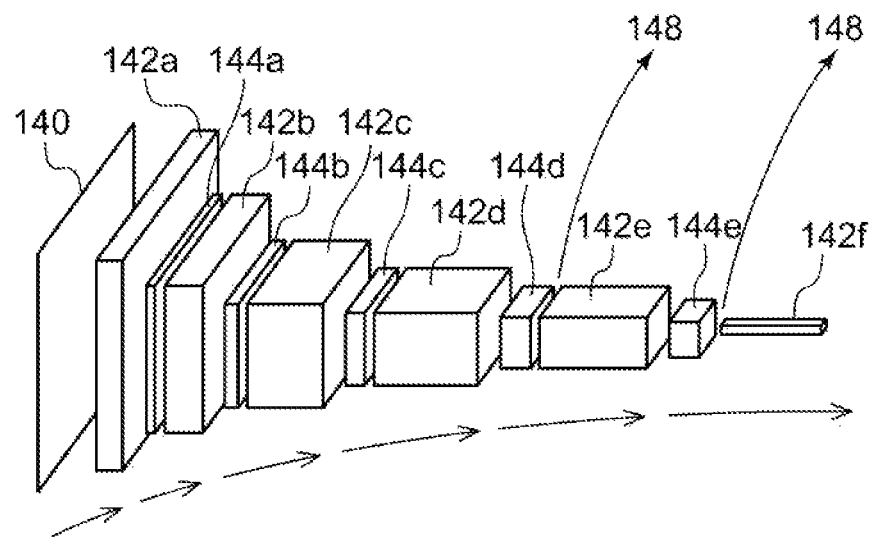
FIG. 4 shows an outline of a process in the processing unit of FIGS. 3A-3B.

FIG. 4 shows an outline of a process in the processing unit 114. The processing unit 114 includes a first convolutional layer 142a, a second convolutional layer 142b, a third convolutional layer 142c, a fourth convolutional layer 142d, a fifth convolutional layer 142e, a sixth convolutional layer 142f, which are generically referred to as convolutional layers 142, a first pooling layer 144a, a second pooling layer 144b, a third pooling layer 144c, a fourth pooling layer 144d, a fifth pooling layer 144e, which are generically referred to as pooling layers 144. The convolutional layers 142 and the pooling layers 144 are shown as blocks to give an image of the respective processes. An input image 140 is an image subject to the process in the processing device 100. The neural network in the processing unit 114 does not include a fully connected layer so that a limit to the size of the input image 140 is not provided. For this reason, the input image 140 may be the image 10 mentioned above. The input image 140 is input to the first convolutional layer 142a.

Each convolutional layer 142 is shown as a hexahedron. The size of the square surface of the convolutional layer 142 having a depth direction and a height direction indicates the size of the spatial dimension of the image processed by the convolutional layer 142, i.e., the size of the image. The convolutional layer 142 subjects the image to spatial filtering, successively shifting a spatial filter of a size smaller than the size of the image. Spatial filtering is a publicly known technology, and a description thereof is omitted. Spatial filtering is equivalent to a convolutional process. The convolution process extracts a feature amount of the image. Padding, etc. may be performed in the convolutional layer 142. The convolutional layer 142 may also use a plurality of spatial filters in parallel and perform a plurality of spatial filtering steps in parallel in the image. Using a plurality of spatial filters in parallel increases the image. The number of spatial filters used in parallel in the convolutional layer 142 is referred to as the number of channels, which is indicated by the length of the convolutional layer 142 in the horizontal direction.

Each pooling layer 144 is configured in a manner similar to that of the convolutional layer 142. The pooling layer 44 reduces the size of the image by aggregating a plurality of pixels included in an arbitrary region in the image into a single pixel. For aggregation of a plurality of pixels into a single pixel, average pooling or maximum pooling is performed. In average pooling, an average value of a plurality of pixel values in the region is used for the single pixel. In maximum pooling, the maximum value of a plurality of pixel values in the region is used for the single pixel. A pooling process is performed to reinforce the robustness for translation of a representative value or an average value in the region of interest.

In this case, the first convolutional layer 142a, the first pooling layer 144a, the second convolutional layer 142b, the second pooling layer 144b, the third convolutional layer 142c, the third pooling layer 144c, the fourth convolutional layer 142d, the fourth pooling layer 144d, the fifth convolutional layer 142e, the fifth pooling layer 144e, and the sixth convolutional layer 142f are arranged in the stated order. In other words, a convolutional process and a pooling process are repeated. By repeating a convolutional process and a pooling process, the size of the image is progressively reduced. The sixth pooling layer 144f outputs an image having one or more channels (hereinafter, referred to as an "output image"). In this case, the number of channels of the output image is assumed to be "3" by way of one example.

Based on the configuration of the processing unit 114 as described above, a description will now be given of the learning process in the processing device 100 with reference to FIG. 3A. The first input unit 110 receives training data that yields a known output image, and the second input unit 112 receives an image for learning corresponding to the training data received in the first input unit 110. The processing unit 114 has the configuration of FIG. 4, and a coefficient of the spatial filter of each convolutional layer 142 is learned, based on the training data received in the first input unit 110 and the image for learning received in the second input unit 112.

Figure 5:
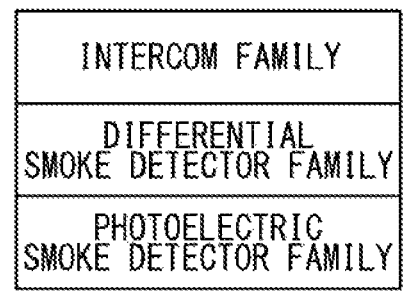
FIG. 5 shows a data structure of training data input to the first input unit of FIG. 3A.

The image for learning includes patterns 20 selected from the intercoms 30, the differential smoke detectors 32, and the photoelectric smoke detectors 34. In the case the image for leaning includes the intercoms 30, the training data is the intercom family. In the case the image for learning includes the differential smoke detectors 32, the training data is the differential smoke detector family. In the case the image for learning includes the photoelectric smoke detectors 34, the training data is the photoelectric detector family. FIG. 5 shows a data structure of training data input to the first input unit 110. The training data has three channels. One of the intercom family, the differential smoke detector family, and the photoelectric smoke detector family is presented in accordance with the image for learning.

In other words, the size of the training data has a 1×1 spatial dimension. Therefore, the training data does not have positional information on the patterns 20 that is included in the image for learning. The training data for one channel merely shows one of the intercom family, the differential smoke detector family, and the photoelectric smoke detector family. Meanwhile, the image for learning is an original image that results in an output of the training data when the image recognition process is performed accurately, and its size is defined to result in a 1×1 spatial dimension of the training data. Since a limit to the size of the input image 140 is not provided, the image for learning and the input image 140 may have different sizes. For learning of a coefficient of the spatial filter under a situation like this where training data and an image for learning are used, a publicly known technology may be used so that a description thereof is omitted.

A description will now be given of the integration process in the processing device 100 with reference to FIG. 3B. In the case the processing devices 100 in FIG. 3A and in FIG. 3B are configured as different devices, the coefficient of the spatial filter derived by learning in the processing unit 114 in FIG. 3A is set in the processing unit 114 in FIG. 3B.

The input unit 120 receives the image 10. It is assumed here that the size of the image 10 is larger than the size of the image for learning. The input unit 120 outputs the image 10 to the first processing unit 122. The first processing unit 122 receives the image 10 from the input unit 120. The first processing unit 122 has a configuration shown in FIG. 4. The received image 10 corresponds to the input image 140. Therefore, the image 10 will be referred to as the input image 140 hereinafter. The first processing unit 122 subjects the input image 140 to a process in a convolutional neural network in which a fully connected layer is excluded. In the convolutional neural network in the first processing unit 122, the spatial filter of the convolutional layer 142 is trained to learn training data for families, the number of families being smaller than the number of types of pattern 20. In particular, the spatial filter of the convolutional layer 142 is trained to learn families corresponding to three channels one for one. This causes the first processing unit 122 to detect each of the plurality of patterns 20 included in the image 10 as one of the families. As mentioned above, the size of the image 10 is larger than the size of the image for learning. Therefore, the first processing unit 122 also detects the positions of the families. FIGS. 6A-6B show results of the process in the processing device 100. FIG. 6A lists the count of each family detected when the image 10 of FIG. 1 is subjected to the process in the first processing unit 122. FIG. 6B will be described later, and reference is made back to FIG. 3B. The first processing unit 122 outputs a plurality of combinations each including the family and the position detected.

The extraction unit 124 receives the plurality of combinations from the first processing unit 122. The extraction unit 124 acquires from each combination the family and the position detected and extracts from the image 10 a part that includes the pattern 20 corresponding to the family. The part has an arbitrary shape and an arbitrary size around the pattern 20 corresponding to the family. The size of the part is smaller than the size of the image 10. Further, the size of the part may be larger than the size of the image for learning. Through this process, the extraction unit 124 extracts a plurality of parts. The extraction unit 124 outputs the plurality of parts to the second processing unit 126.

Because the second processing unit 126 shares a neural network with the first processing unit 122 and so uses the neural network used in the first processing unit 122. The second processing unit 126 subjects the plurality of parts extracted by the extraction unit 124 to a neural network process. The neural network process is the same as the process in the first processing unit 122, and a description thereof is omitted. As shown in FIG. 4, the second processing unit 126 acquires intermediate data 148 for an intermediate layer unique to each part. The intermediate data 148 is data output from an intermediate layer that precedes the output of the second processing unit 126 by one or two steps and is presented as n-dimensional data like (v1, v2, . . . vn). The second processing unit 126 outputs the intermediate data 148 to the clustering unit 128 for each part, i.e., for each family detected.

The clustering unit 128 subjects a plurality of items of intermediate data 148 acquired by the second processing unit 126 to clustering in accordance with the number of types of pattern 20. For clustering, K-means method, self-organizing map, minimum average variance method, nearest neighbor method, minimum distance method, K-nearest neighbor method, Ward method, etc. can be used. These are publicly known technologies, and a description thereof is omitted.

Figure 7:
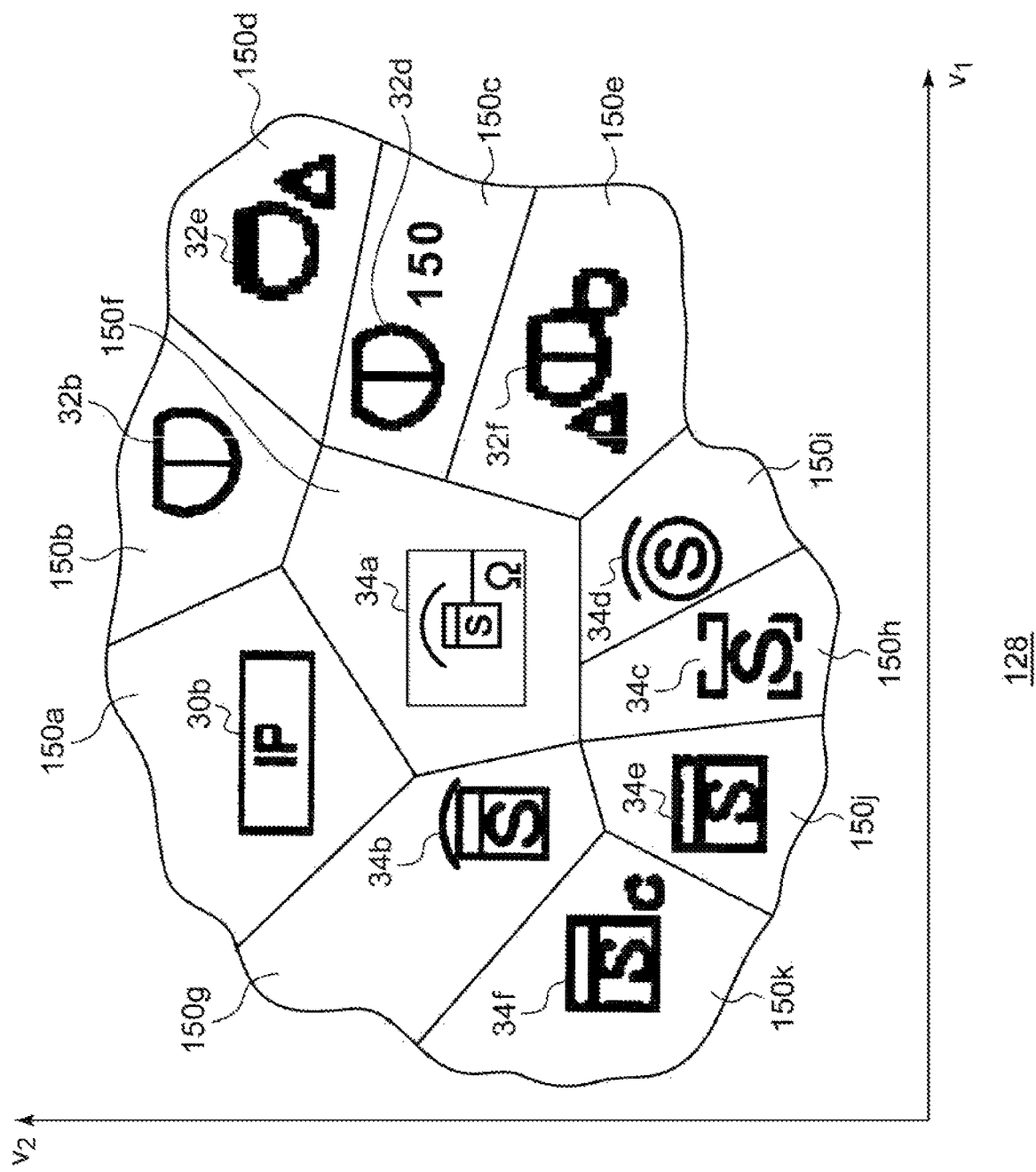
FIG. 7 shows an outline of the process in the clustering unit of FIG. 3B.

FIG. 7 shows an outline of the process in the clustering unit 128. For clarity of explanation, it is hypothesized here that the intermediate data 148 is two-dimensional data denoted by (v1, v2). The clustering unit 128 places the plurality of items of intermediate data 148 in an orthogonal coordinate system having v1 and v2 axes. The clustering unit generates a first cluster 150a through an 11th cluster 150k, generically referred to as clusters 150, by subjecting the plurality of items of intermediate data 148 placed in the orthogonal coordinate system to clustering. Each cluster 150 corresponds to one of the patterns 20. For example, the first cluster 150a corresponds to the second intercom 30b. Reference is made back to FIG. 3B.

The calculation unit 130 calculates the number of patterns 20 included in each cluster resulting from clustering in the clustering unit 128. FIG. 6B shows a calculation result in the calculation unit 130. The calculation identifies one second intercom 30b and eight second differential smoke detectors 32b. Reference is made back to FIG. 3B. The output unit 132 outputs the calculation result in the calculation unit 130.

The device, the system, or the entity that executes the method according to the disclosure is provided with a computer. By causing the computer to run a program, the function of the device, the system, or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

Figure 8:
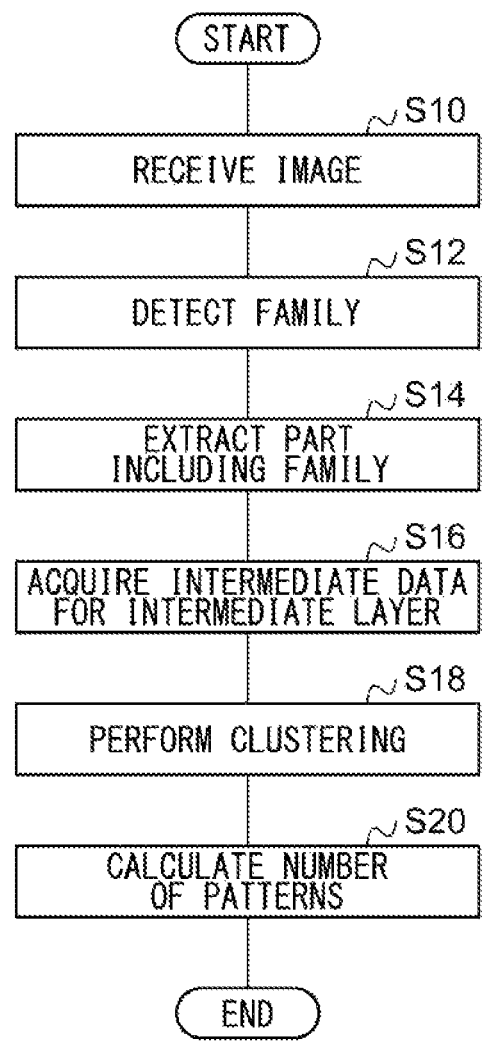
FIG. 8 is a flowchart showing a sequence of steps performed in the processing device of FIG. 3B.

A description will now be given of the operation of the processing device 100 having the configuration described above. FIG. 8 is a flowchart showing a sequence of steps performed in the processing device 100. The input unit 120 receives an input of the image 10 (S10). The first processing unit 122 detects families (S12). The extraction unit 124 extracts parts that include families (S14). The second processing unit 126 acquires the intermediate data 148 for the intermediate layers (S16). The clustering unit 128 performs clustering (S18). The calculation unit 130 calculates the number of patterns 20 (S20).

According to this embodiment, the parts that include families detected from the image 10 are subjected to a neural network process. Therefore, the impact from those features included in the image 10 other than the patterns 20 is reduced. Further, since the impact from those features included in the image 10 other than the patterns 20 is reduced, the precision of the process is improved. Since the intermediate data 148 in the neural network process is acquired, the volume information is increased. Further, since the volume of information is increased, the precision of the process is improved. Further, since the number of patterns 20 included in each cluster 150 is calculated by subjecting the intermediate data 148 to clustering, it is possible to inhibit reduction in the accuracy of the process, while inhibiting an increase in the volume of work required for learning.

Further, since the intermediate data 148 for an intermediate layer that precedes the output by one or two steps is acquired, it is possible to acquire highly accurate data having a large volume of information is acquired. Further, since the second processing unit 126 uses the neural network used in the first processing unit 122, the result of leaning can be shared. Further, since a convolutional neural network in which the spatial filter of the convolutional layer 142 is trained to learn training data having a 1×1 spatial dimension is used, the volume of work required to create the training data is reduced. Further, since the volume of work required to create the training data is reduced, it is possible to inhibit an increase in the volume of work required for learning. Further, since the volume of work required to create training data is reduced, the number of items of training data is increased. Further, since the number of items of training data is increased, the precision of learning is improved.

One embodiment of the present disclosure is summarized below. A processing device (100) according to an embodiment of the present disclosure is a processing device (100) for integrating a plurality of patterns included in an image (10) for each type of pattern, comprising: an input unit (120) that receives an input of an image (10); a first processing unit (122) that detects each of a plurality of patterns (20) included in the image (10) as one of families that organize types of pattern (20), by subjecting the image (10) input to the input unit (120) to a process in a neural network trained to learn the families as training data, a number of families being smaller than a number of types of pattern (20); an extraction unit (124) that extracts a plurality of parts that include families from the image (10), based on a position of the families detected by the first processing unit (122); a second processing unit (126) that acquires intermediate data (148) for an intermediate layer unique to each family, by subjecting the plurality of parts extracted by the extraction unit (124) to a process in a neural network trained to learn the families as training data, the families organizing the types of pattern (20), and the number of families being smaller than the number of types of pattern (20); a clustering unit (128) that subjects the intermediate data (148) acquired by the second processing unit (126) to clustering in accordance with the number of types of pattern (20); and a calculation unit (130) that calculates a number of patterns (20) included in each cluster (150) that results from clustering in the clustering unit (128).

The second processing unit (126) may acquire intermediate data (148) for an intermediate layer that precedes an output by one or two steps.

The second processing unit (126) may use the neural network used in the first processing unit (122).

The neural network used in the first processing unit (122) and the second processing unit (126) may include a convolutional layer (142) and a pooling layer (144) and may be a convolutional neural network in which a fully connected layer is excluded, and a filter in the convolutional layer (142) in the convolutional neural network may be trained to learn a processing result having a 1×1 spatial dimension.

Another embodiment of the present disclosure relates to a processing method. The method is a processing method for integrating a plurality of patterns (20) included in an image (10) for each type of pattern (20), comprising: receiving an input of an image (10); detecting each of a plurality of patterns (20) included in the image (10) as one of families that organize types of pattern (20), by subjecting the image (10) input to a process in a neural network trained to learn the families as training data, a number of families being smaller than a number of types of pattern (20); extracting a plurality of parts that include families from the image (10), based on a position of the families detected; acquiring intermediate data (148) for an intermediate layer unique to each family, by subjecting the plurality of parts extracted to a process in a neural network trained to learn the families as training data, the families organizing the types of pattern (20), and the number of families being smaller than the number of types of pattern (20); subjecting the intermediate data (148) acquired to clustering in accordance with the number of types of pattern (20); and calculating a number of patterns (20) included in each cluster (150) that results from clustering.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

The processing unit 114 according to the embodiment is configured such that the plurality of convolutional layers 42 and the plurality of pooling layers 44 are alternately arranged. Alternatively, however, the processing unit 114 may have a configuration of a GoogleNet-based network, a DenseNet-based network, etc. According to this variation, the flexibility in configuration can be improved.

In the processing unit 114 according to this embodiment, a convolutional neural network in which a fully connected layer is excluded, i.e., a fully convolutional neural network, is used. Alternatively, however, a convolutional neural network in which a fully connected layer is included may be used, for example. In this case, the size of an image that should be input to the input unit 120 is fixed so that the image 10 is split into a fixed size and is input to the input unit 120. According to this variation, the flexibility in configuration can be improved.

INDUSTRIAL APPLICABILITY

According to the present disclosure, it is possible to inhibit reduction in the accuracy of the process, while inhibiting an increase in the volume of work required for learning at the same time.

REFERENCE SIGNS LIST 10 image, 20 pattern, 30 intercom, 32 differential smoke detector, 34 photoelectric smoke detector, 100 processing device, 110 first input unit, 112 second input unit, 114 processing unit 114, 120 input unit, 122 first processing unit, 124 extraction unit, 126 second processing unit, 128 clustering unit, 130 calculation unit, 132 output unit, 140 input image, 142 convolutional layer, 144 pooling layer

The invention claimed is:

1. A processing device for integrating a plurality of patterns included in an image for each type of pattern, comprising:
    an input unit that receives an input of an image;
    a first processing unit that detects each of the plurality of patterns included in the image as one of families that organize types of pattern, by subjecting the image input to the input unit to a process in a neural network trained to learn the families as training data, a number of families being smaller than a number of types of pattern;
    an extraction unit that extracts a plurality of parts that include families from the image, based on a position of the families detected by the first processing unit;
    a second processing unit that acquires intermediate data for an intermediate layer unique to each family, by subjecting the plurality of parts extracted by the extraction unit to a process in a neural network trained to learn the families as training data, the families organizing the types of pattern, and the number of families being smaller than the number of types of pattern;
    a clustering unit that subjects the intermediate data acquired by the second processing unit to clustering in accordance with the number of types of pattern; and
    a calculation unit that calculates a number of patterns included in each cluster that results from clustering in the clustering unit.

2. The processing device according to claim 1, wherein the second processing unit acquires intermediate data for an intermediate layer that precedes an output by one or two steps.

3. The processing device according to claim 2, wherein the second processing unit uses the neural network used in the first processing unit.

4. The processing device according to claim 3, wherein the neural network used in the first processing unit and the second processing unit includes a convolutional layer and a pooling layer and is a convolutional neural network in which a fully connected layer is excluded, and a filter in the convolutional layer in the convolutional neural network is trained to learn a processing result having a 1×1 spatial dimension.

5. The processing device according to claim 1, wherein the second processing unit uses the neural network used in the first processing unit.

6. The processing device according to claim 5, wherein the neural network used in the first processing unit and the second processing unit includes a convolutional layer and a pooling layer and is a convolutional neural network in which a fully connected layer is excluded, and a filter in the convolutional layer in the convolutional neural network is trained to learn a processing result having a 1×1 spatial dimension.

7. A processing method for integrating a plurality of patterns included in an image for each type of pattern, comprising:
    receiving an input of an image;
    detecting each of the plurality of patterns included in the image as one of families that organize types of pattern, by subjecting the image input to a process in a neural network trained to learn the families as training data, a number of families being smaller than a number of types of pattern;

extracting a plurality of parts that include families from the image, based on a position of the families detected;

acquiring intermediate data for an intermediate layer unique to each family, by subjecting the plurality of parts extracted to a process in a neural network trained to learn the families as training data, the families organizing the types of pattern, and the number of families being smaller than the number of types of pattern;

subjecting the intermediate data acquired to clustering in accordance with the number of types of pattern; and calculating a number of patterns included in each cluster that results from clustering.

* * * * *